United States Patent [19]

McMahan et al.

[11] 4,414,614

[45] Nov. 8, 1983

[54] SPRING CLIP FOR A VEHICLE HEADLAMP RETAINER MEMBER

[75] Inventors: David R. McMahan; Richard W. Nicholas, both of Anderson, Ind.

[73] Assignee: General Motors Corporation, Detroit, Mich.

[21] Appl. No.: 450,684

[22] Filed: Dec. 17, 1982

[51] Int. Cl.³ .............................................. F21V 21/26
[52] U.S. Cl. ..................................... 362/269; 362/80;
362/83; 362/287; 362/289; 362/374; 362/371;
362/428; 362/375
[58] Field of Search ............... 362/269, 287, 289, 371,
362/374, 375, 428, 80, 83

[56] References Cited

U.S. PATENT DOCUMENTS

| 4,149,229 | 4/1979 | Draper | 362/349 |
| 4,277,818 | 7/1981 | Urbanek et al. | 362/267 |
| 4,345,307 | 8/1982 | Mayer et al. | 362/369 |

Primary Examiner—Stephen J. Lechert, Jr.
Assistant Examiner—Joel P. Okamoto
Attorney, Agent, or Firm—Edward J. Biskup

[57] ABSTRACT

A spring clip which is removably attached to a retainer member for maintaining a headlamp within a housing and includes a pair of leg sections carried by the housing that cooperate with a flange on the retainer member for locking the retainer member to the housing.

3 Claims, 7 Drawing Figures

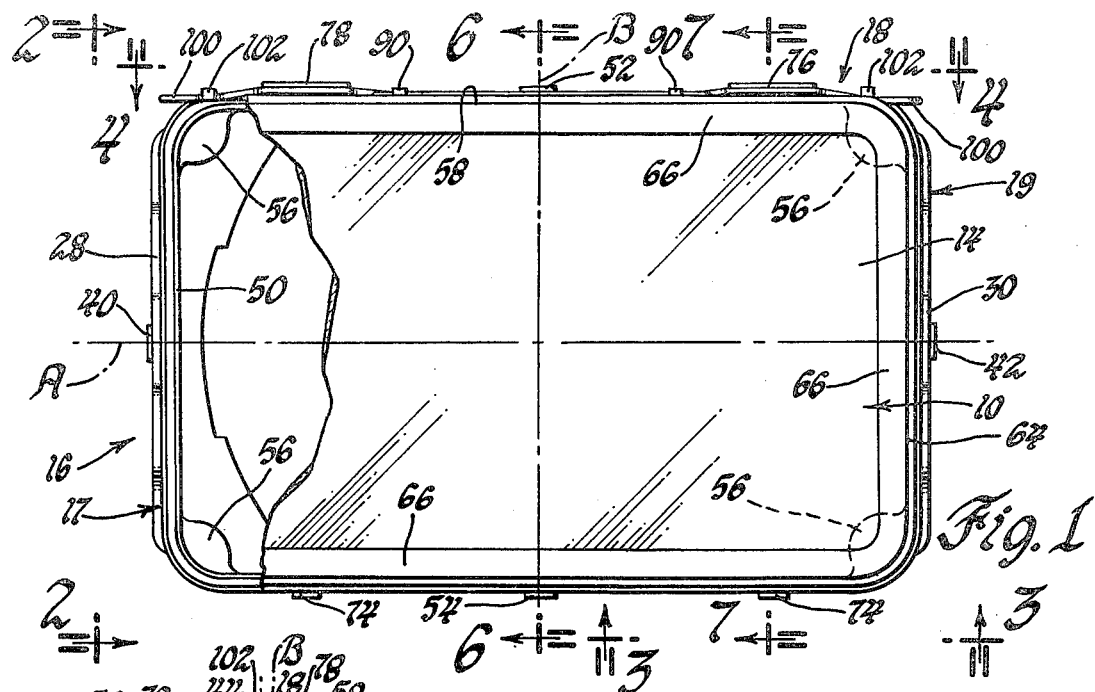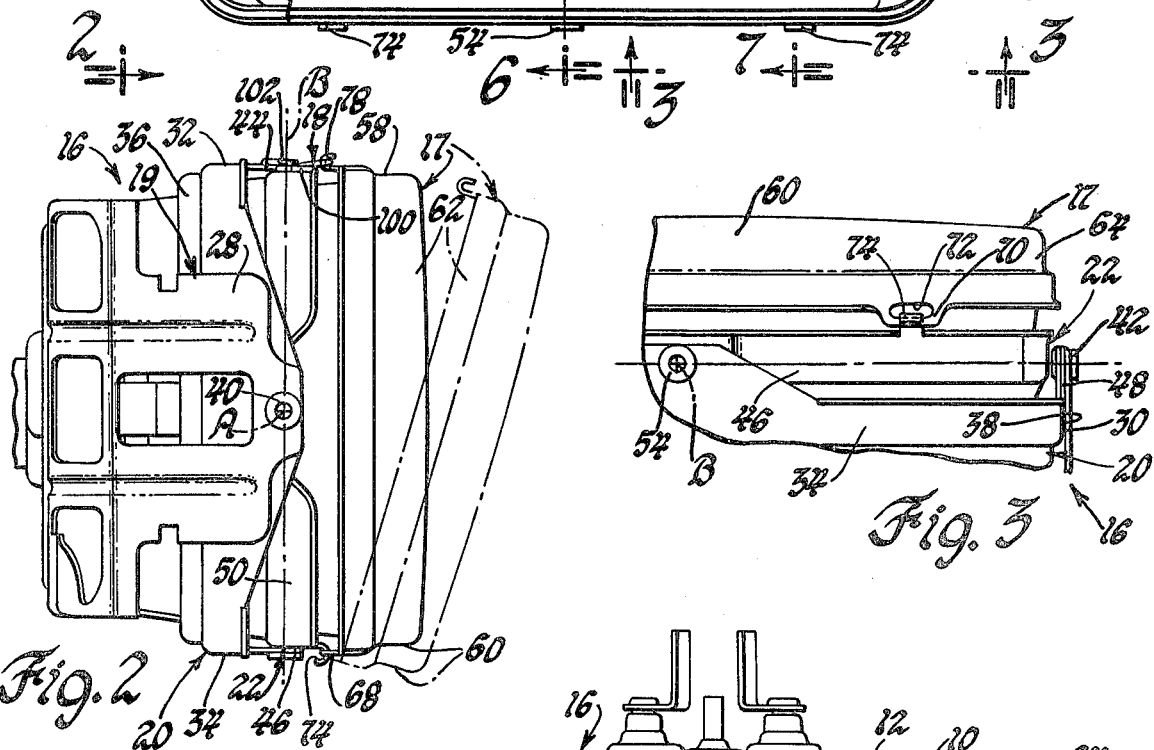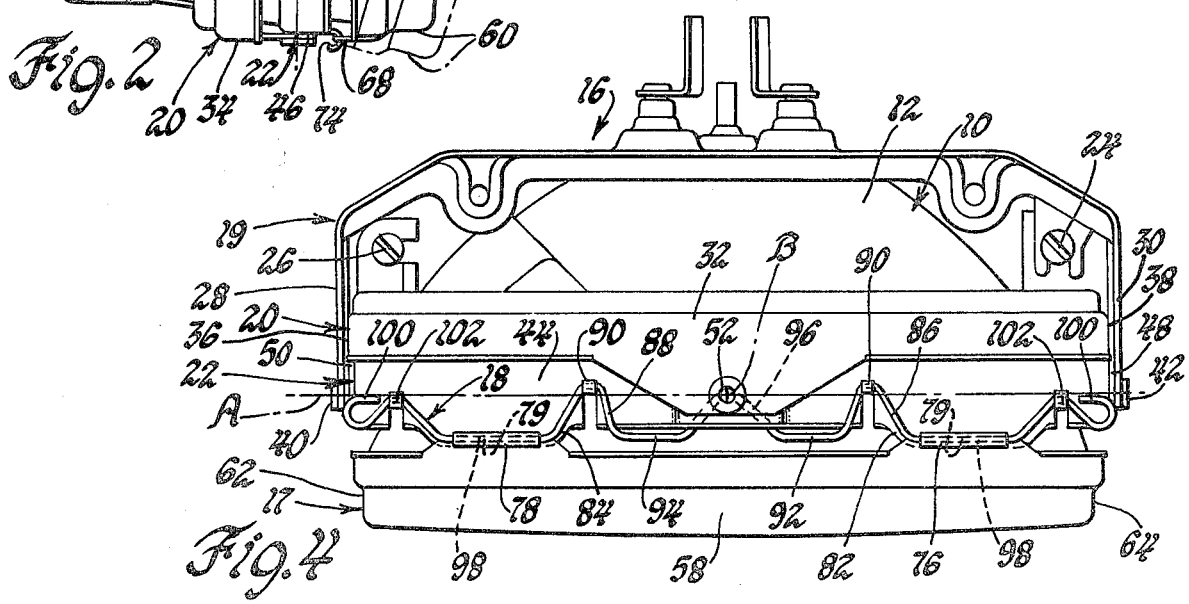

SPRING CLIP FOR A VEHICLE HEADLAMP RETAINER MEMBER

This invention relates to a vehicle headlamp retainer member and more particularly pertains to a spring clip which cooperates with a retainer member for maintaining a headlamp in a support housing located at the front end of a vehicle body.

More specifically, the spring clip, according to the present invention, is combined with a retainer member that includes parallel and vertically spaced top and bottom wall sections connected to a pair of parallel and horizontally spaced side wall sections so as to form a rectangular frame for surrounding the lens of a rectangular headlamp. Each of the wall sections is integrally formed with a radially inwardly extending rim which is inclined towards the rear of the headlamp support housing. The rim is adapted to contact the frontal portion of the lens of the headlamp and serves as a spring for biasing the headlamp firmly in contact with the support housing. In the preferred form, the bottom wall section of the retainer member is formed with a pair of ears each of which has an aperture formed therein that receives a hook rigidly formed on the bottom of the support housing for connecting the bottom wall section to the support housing. In addition, a pair of upwardly extending flanges, each of which is provided with an elongated and horizontally oriented channel, are formed on the top wall section of the retainer member. The channel in each flange cooperates with the spring clip carried by the support housing that has opposed leg sections for connecting the top wall section to the support housing. When it is necessary to remove the headlamp from the support housing, a tang firmed with each leg section of the spring clip is manually bent rearwardly and raised upwardly to disengage the tang from a hook on the support housing after which the tang is moved forwardly to permit a portion of the leg section to be removed from the channel of the associated flange and thereby allow the retainer member to be pivoted away from the support housing about an axis extending through the ears of the bottom wall section. Afterwards the ears of the bottom wall section can be released from engagement with the cooperating hooks on the support housing and the retainer member can be removed to allow replacement of headlamp.

The objects of the present invention are to provide a new and improved spring clip which is combined with a retainer member for securely maintaining a headlamp within a housing and that can be manually attached and released from engagement with the retainer member without requiring any tools; to provide a new and improved spring clip which cooperates with a retainer member for maintaining a headlamp within a housing and is characterized in that a pair of axially aligned straight portions of the spring clip are adapted to be located the retainer member and the straight portions are manually removable from the accommodating channels when it is desired to remove the headlamp from the housing; and, to provide a new and improved spring clip which is removably attached to a retainer member for maintaining a rectangular headlamp within a housing and that includes a pair of leg sections each of which is carried by the housing and cooperates with a reversely bent flange on the retainer member for locking the retainer member to the housing.

These and other objects and advantages of the invention will be apparent from the following detailed description taken in conjunction with the accompanying drawings, in which:

FIG. 1 is a front elevational view of a support housing provided with a retainer member and a spring clip made in accordance with the present invention for maintaining a headlamp within the support housing;

FIG. 2 is a side elevational view taken on line 2—2 of FIG. 1 showing one side of the support housing and the retainer member;

FIG. 3 is a fragmentary bottom view taken on line 3—3 of FIG. 1 showing one of the two ears formed on the bottom wall section of the retainer member;

FIG. 4 is a top plan view taken on line 4—4 of FIG. 1 showing the support housing and the top wall section of the retainer member that carries the spring clip;

Figure 5:
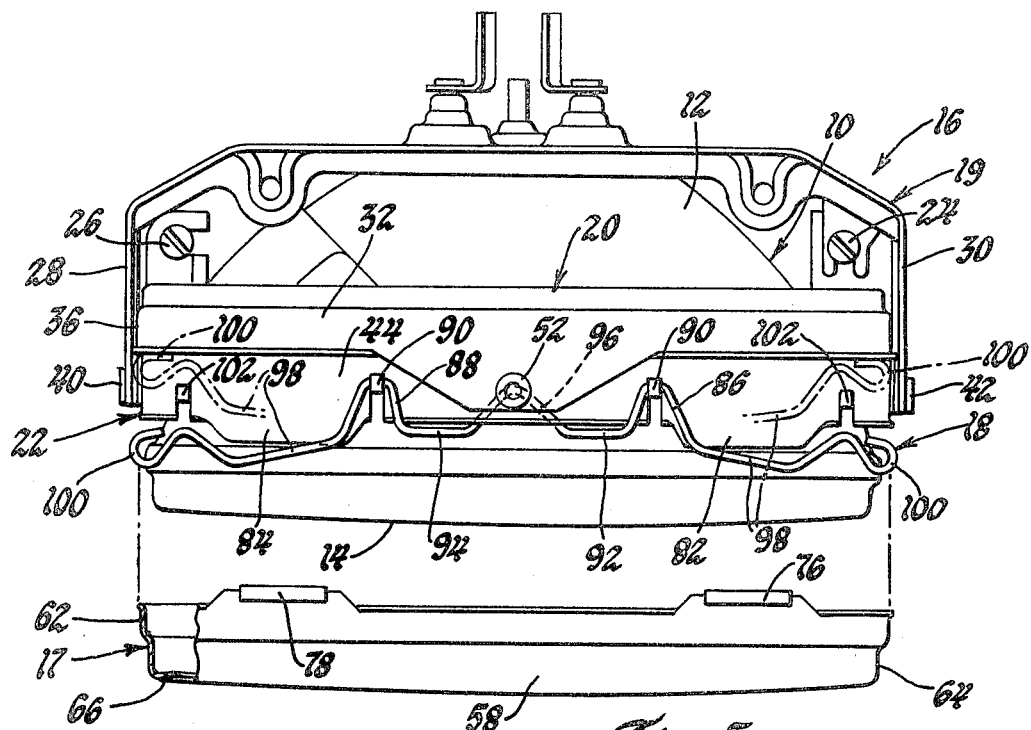
FIG. 5 is similar to the view shown in FIG. 4 but shows the retainer member detached from the support housing after the leg sections of the spring clip are released from engagement with hooks formed on the support housing.
Figure 6:
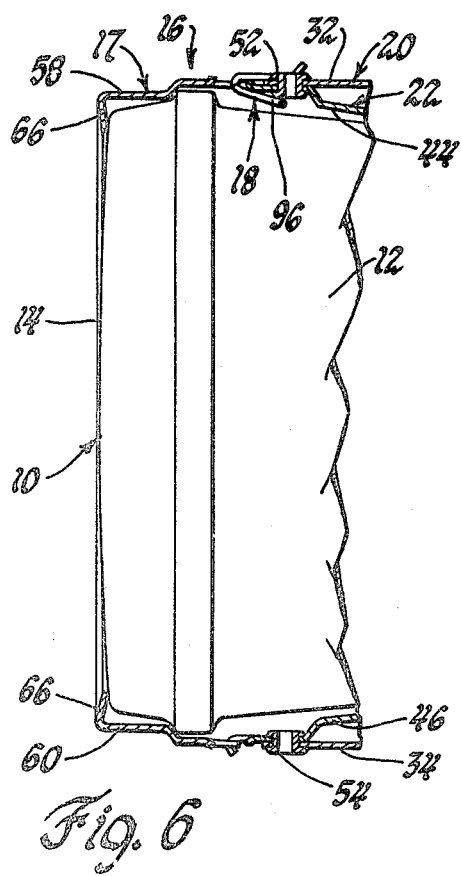
FIG. 6 is a sectional view taken on line 6—6 of FIG. 1.
Figure 7:
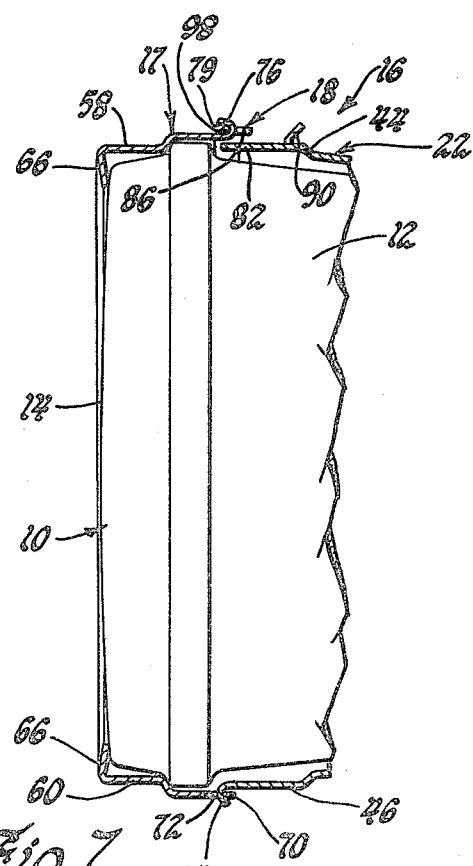
FIG. 7 is a sectional view taken on line 7—7 of FIG. 1.

Referring now to the drawings and more particularly to FIGS. 1 through 4, a conventional rectangular vehicle headlamp 10, comprising a reflector 12 and lens 14, is shown being maintained within a support housing 16 by a retainer member 17 and a spring clip 18 made in accordance with the present invention. In general, the support housing 16 includes a bracket member 19, a pair of pivotally interconnected rectangular ring members 20 and 22, and a pair of vertically oriented adjustment screws 24 and 26 which provide aiming adjustment of the headlamp 10 about a horizontal pivot axis identified by the letter A and a vertical pivot axis identified by the letter B in FIGS. 2 and 4. Each of the adjustment screws 24 and 26 is accessible from above the support housing 16 and is located to the rear of the headlamp lens 14 but within the peripheral confines thereof as seen in FIGS. 1 and 2. A complete description of the construction and operation of the support housing 16 can be found in copending U.S. patent application D-5,848, filed concurrently with this application in the name of David R. McMahan, entitled Support Housing For a Vehicle Headlamp, and assigned to the assignee of this invention. However, for present purposes it should be mentioned that the ring member 20 is located between the arms 28 and 30 of the bracket member 19, and is formed as a sheet metal stamping of generally rectangular configuration. The ring member 20 comprises parallel and vertically spaced top and bottom wall members 32 and 34 connected to a pair of horizontally spaced side wall members 36 and 38. The side wall members 36 and 38 are respectively connected to the arms 28 and 30 of the bracket member 19 by the horizontally aligned pivotal connections 40 and 42 which permit the ring member 20 to pivot about the horizontal pivot axis A relative to the fixed bracket member 19 when the adjustment screw 24 is rotated.

Similarly, the ring member 22 is a sheet metal stamping of generally rectangular configuration and of slightly smaller size than ring member 20 so as to allow ring member 22 to be located within and in close proximity to ring member 20. The ring member 22 comprises parallel vertically spaced top and bottom wall members 44 and 46 connected to a pair of horizontally spaced side wall members 48 and 50. The wall members 44 and 46 of ring member 22 are connected to the corresponding top and bottom wall members 32 and 34 of ring member 20 by vertically aligned pivotal connections 52 and 54 which allow the ring member 22 to pivot about the vertical axis B relative to ring member 20, under the control of the adjustment screw 26 carried by the ring member 20.

The headlamp 10 is carried by the ring member 22 and it will be noted that, as seen in FIG. 1, each corner of ring member 22 is integrally formed with a radially inwardly extending locator portion having a vertically oriented planar surface 56 against which one of the usual four corner seating pads (not shown) formed on the rear of the reflector 12 is seated for properly locating the headlamp 10 relative to the ring member 22. The retainer member 17, in the form of a rectangular frame, surrounds the lens 14 of headlamp 10 and serves to maintain the headlamp 10 securely within the ring member 22 by applying a rearwardly directed face to the frontal portion of the lens 14 so as to cause the seating pads of the headlamp 10 to be firmly in contact with the surfaces 56 of the locator portions formed on the ring member 22. The retainer member 17 includes parallel and vertically spaced top and bottom wall sections 58 and 60 which connect with a pair of parallel and horizontally spaced side wall sections 62 and 64. The top and bottom wall sections 58 and 60 and side wall sections 62 and 64 are integrally formed with a radially inwardly extending rim 66 which is inclined towards the rear of the support housing 16. The rim 66 formed with each wall section contacts the frontal portion of the lens 14 and serves as a spring to bias the seating pads of the headlamp 10 firmly in contact with the surfaces 56 of the ring member 22. As seen in FIGS. 2 and 3 the bottom wall section 60 of the retainer member 17 is formed with a pair of identical ears 68 and 70 which are spaced an equal distance from the side wall sections 62 and 64 respectively. Each ear 68 and 70 has an aperture 72 formed therein that receives a hook 74 rigidly formed with the bottom wall member 46 of the ring member 22. In this manner, the bottom wall section 60 of the retainer member 17 is connected to the ring member 22.

As seen in FIGS. 2, 4, 5, and 7, a pair of horizontally spaced and reversely bent flanges 76 and 78 are formed with the top wall section 58 of the retainer member 17. Each of the flanges 76 and 78 provides an elongated horizontally oriented channel 79 (FIG. 7) which cooperates with portions of the spring clip 18 for connecting the top wall section 58 of the retainer member 17 to the ring member 22. It will be noted that the flanges 76 and 78 are respectively seated on lips 82 and 84 projecting forwardly from the top wall member 44 of the ring member 22. It will also be noted that each spring clip 18 is made from a single strand of spring wire and includes a pair of identical U-shaped sections 86 and 88 each of which is retained by a hook 90 fixed to the top wall member 44 of the ring member 22. The U-shaped sections 86 and 88 are interconnected by an intermediate section consisting of a pair of axially aligned straight portions 92 and 94 connected to a V-shaped portion 96 located midway between the U-shaped sections 86 and 88 and below top wall member 44 of the ring member 22. A leg section is also connected to each of the U-shaped sections 86 and 88 and each leg section includes a straight portion 98 which as seen in FIG. 4, is located in a vertical plane forwardly offset from and parallel to a vertical plane passing through the straight portions 92 and 94 of the intermediate section of the spring clip 18. As seen in FIG. 4, the straight portion 98 is normally located in the channel 79 of the associated flange portion. Thus, each of the straight portions 92, 94 and the channel 79 of the associated flange 76, 78, in effect, constitute a bolt and keeper arrangement for locking or latching the retainer member 17 to the support housing. In addition, each leg section terminates with a tang portion 100 which engages a hook 102 formed on the front edge of the rim member 22 adjacent each side wall member thereof.

As seen in FIGS. 2, 4, and 5, the retainer member 17 can be released from the ring member 22 for the removal of the headlamp 10 by initially manually moving the tang portion 100 of each leg section rearwardly to the phantom line position (FIG. 4) to disengage each leg section from the hook 102 after which the tang portion 100 is raised upwardly of the top wall member 44 of ring member 22 to clear the hook 102. Each leg section is then bent forwardly to the full line position (FIG. 4) to remove the straight portion 98 from the accommodating channel 79 of the associated flange after which the top wall section is tilted or pivoted about the hooks 74 (FIG. 2) to remove the retainer member 17 from the support housing 16. As seen in FIG. 5, after the retainer member 17 is removed from the support housing 16, the headlamp 10 can be readily replaced with a new headlamp. Also, inasmuch as the V-shaped portion 96 of the intermediate section of the spring clip 18 is located below the top wall member 44 of ring member 22 and the U-shaped portions 86 and 88 are located above and rest upon the top wall member 44 behind the hooks 90, the spring clip 18 is essentially secured to the ring member 22 and retained thereby after the leg sections assume the "released" or "unlocked" position shown in full lines in FIG. 5.

Various changes and further modifications can be made in the construction of this spring clip without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination, a spring clip and a retainer member for maintaining a headlamp in a housing located at the front end of a vehicle body, said retainer member comprising a frame formed with a radially inwardly extending rim which is inclined towards the rear of said housing for engaging the frontal portion of the lens of said headlamp and biasing the headlamp into firm contact with said housing, hinge means formed on a first portion of said frame and adapted to connect said retainer member to said housing for pivotal movement about an axis perpendicular to the optical axis of the headlamp, a pair of flange members connected to a second portion of said frame, each of said flange members having an elongated horizontal channel formed therein, said spring clip including a pair of U-shaped sections carried by said housing and being interconnected by an intermediate section, a leg section connected to each of said U-shaped sections and including a straight portion adapted to be located in the channel of one of said flange members, and a tang formed on said straight portion and adapted to be releasably attached to said housing and cooperate with said straight portion for locking said retainer member to said housing when said hinge means is connected to said first portion of said frame.

2. In combination, a spring clip and a retainer member for maintaining a rectangular headlamp in a housing located at the front end of a vehicle body, said retainer member including parallel and vertically spaced top and bottom wall sections, a pair of parallel and horizontally spaced side wall sections connected to said top and bottom wall sections so as to form a rectangular frame for surrounding the lens of said headlamp, each of said wall sections being formed with a radially inwardly extending rim which is inclined towards the rear of said housing for engaging the frontal portion of said lens and biasing the headlamp into firm contact with said housing, hinge means formed on one of said top and bottom wall sections and adapted to connect said retainer member to said housing for pivotal movement about a horizontal axis, a pair of flange members connected to the other of said top and bottom wall sections, each of said flange members being reversely bent to firm an elongated horizontal channel, said spring clip being carried by said housing and having a pair of leg sections each comprising a straight portion reversely bent to firm an elongated horizontal channel, said spring clip being carried by said housing and having a pair of leg sections each comprising a straight portion terminating with a tang, an intermediate section interconnecting said leg sections, said straight portion of each of said leg sections adapted to be located within the channel of one of said flange members and said tang of each straight portion adapted to be releasably attached to said housing for locking said retainer member to said housing.

3. In combination, a spring clip and a retainer member for maintaining a rectangular headlamp in a housing located at the front end of a vehicle body, said housing having opposed wall members defining a rectangular opening for receiving the rear portion of said headlamp, said retainer member including parallel and vertically spaced top and bottom wall sections, a pair of parallel and horizontally spaced side wall sections connected to said top and bottom wall sections so as to form a rectangular frame for surrounding the peripheral portion of the lens of said headlamp, each of said wall sections being formed with a radially inwardly extending rim which is inclined towards the said opening in said housing for engaging the frontal portion of said lens and biasing the headlamp into firm contact with said housing, hinge means formed on one of said top and bottom wall sections and adapted to connect said retainer member to said housing for pivotal movement about a horizontal axis, a pair of flange members connected to the other of said top and bottom wall sections, each of said flange members having an elongated horizontal channel formed therein, said spring clip being carried by said housing and having a pair of leg sections adapted to be located on one side of one of said wall members of said housing and connected to an intermediate section adapted to be located on the opposite side of said one of said wall members, each of said leg sections comprising a straight portion terminating with a tang, said straight portion of each of said leg sections adapted to be located within the channel of one of said flange members and said tang adapted to be releasably attached to said housing for locking said retainer member to said housing.

* * * * *